United States Patent [19]

Duffie

[11] Patent Number: 5,303,320
[45] Date of Patent: Apr. 12, 1994

[54] FIBER OPTIC SIGNAL DISTRIBUTION SYSTEM AND RACEWAY AND PANEL ASSOCIATED THEREWITH

[75] Inventor: David B. Duffie, 2142 Cambridge Ave., Cardiff, Calif. 92007

[73] Assignees: David B. Duffie; Renney E. Senn, both of San Diego, Calif.

[21] Appl. No.: 29,698

[22] Filed: Mar. 11, 1993

Related U.S. Application Data

[63] Continuation-in-part of Ser. No. 948,163, Sep. 21, 1992, abandoned.

[51] Int. Cl.⁵ .................................................. G02B 6/36
[52] U.S. Cl. .................................. 385/135; 385/134; 385/55; 385/147; 385/138; 385/139
[58] Field of Search ............... 385/14, 55, 59, 71, 385/76, 134, 135, 136, 137, 138, 139, 147; 439/207, 210, 211, 212, 215, 216; 174/48, 49, 66, 67, 68.1, 95, 98

[56] References Cited

U.S. PATENT DOCUMENTS

| | | | |
|---|---|---|---|
| Re. 31,733 | 11/1984 | Haworth et al. | 339/4 |
| 3,833,840 | 9/1974 | Sinden | 439/207 X |
| 4,199,206 | 4/1980 | Haworth et al. | 339/4 |
| 4,203,639 | 5/1980 | Vandenhoek et al. | 174/49 |
| 4,277,123 | 7/1981 | Haworth et al. | 339/22 |
| 4,370,008 | 10/1983 | Haworth et al. | 339/4 |
| 4,630,886 | 12/1986 | Lauriello et al. | 385/135 X |
| 4,703,985 | 11/1987 | Finkbeiner et al. | 439/207 |
| 4,717,231 | 1/1988 | Dewez et al. | 385/135 |
| 4,818,054 | 4/1989 | George et al. | 385/135 X |
| 4,841,699 | 6/1989 | Wilson et al. | 52/221 |
| 4,911,510 | 3/1990 | Jenkins | 350/96.10 |
| 4,971,421 | 11/1990 | Ori | 385/135 |
| 4,976,510 | 12/1990 | Davila et al. | 385/92 |
| 5,013,112 | 5/1991 | Hellwig | 385/147 |
| 5,024,614 | 6/1991 | Dola et al. | 174/48 |
| 5,049,700 | 9/1991 | Kobayashi et al. | 174/48 |
| 5,093,885 | 3/1992 | Anton | 385/135 X |
| 5,100,221 | 3/1992 | Carney et al. | 385/135 |
| 5,109,467 | 4/1992 | Hogan et al. | 385/135 |
| 5,127,082 | 6/1992 | Below et al. | 385/135 |
| 5,133,038 | 7/1992 | Zipper | 385/135 |
| 5,142,606 | 8/1992 | Carney et al. | 385/135 X |
| 5,149,277 | 9/1992 | LeMaster | 439/207 |
| 5,178,555 | 1/1993 | Kilpatrick et al. | 439/215 |

FOREIGN PATENT DOCUMENTS 8122026  5/1983  France ....................... 385/135 X

OTHER PUBLICATIONS

Hecht, *Understanding Fiber Optics*, Chapter 2 (1987).

Primary Examiner—Brian Healy
Attorney, Agent, or Firm—Brown, Martin, Haller & McClain

[57] ABSTRACT

Apparatus is disclosed forming an optical fiber communication signal distribution system which is uniquely designed to cooperate with the interior or edges of a typical modular office panel or an extension thereto. It can conveniently be considered to have three key interacting and cooperating elements; a removable channel, a complementary raceway, and optical fiber signal distribution means incorporated into the channel. The system typically provides fiber optic communication signals to a variety of computers and communication devices such as telephones and facsimile machines. The system is flexible and can be used to serve any number of work stations within the modular cluster. It also provides for routing and passage of electrical power lines as well as the optical communications fibers.

55 Claims, 4 Drawing Sheets

FIG. 9 ered by conventional electrical wires. In addition, since there is no radiation field surrounding an optical fiber as there is surrounding an electric wire, many optical fibers can be bundled together without interference between their carried signals. Because of this transition to optical fiber communications, there has been a clear need to be able to use optical fibers in modular office panel systems in place of electrical communication systems.

FIBER OPTIC SIGNAL DISTRIBUTION SYSTEM AND RACEWAY AND PANEL ASSOCIATED THEREWITH

CROSS REFERENCE TO RELATED APPLICATION

This application is a continuation-in-part of application Ser. No. 07/948,163, filed Sep. 21, 1992, entitled FIBER OPTIC SIGNAL DISTRIBUTION MODULE AND PANEL RACEWAY, now abandoned.

BACKGROUND OF THE INVENTION

1. Field of the Invention

The invention herein relates to fiber optic communications and to the use of optical fibers in conjunction with office equipment. More particularly relates to apparatus for the incorporation of optical fiber distribution systems in modular office furnishings.

2. Background of the Invention

It is common in many offices, research facilities, light manufacturing plants and similar work places to have a number of people all working in the same room. Each employee's work space is defined by work area furnishings, which are commonly modular structures. Typically the work areas are formed by the interconnection of modular panels to form clusters of work areas. These panels also normally can be configured to include counters or desk tops, book shelves, storage cabinets and the like, so that each employee's work space can be configured to the optimum arrangement for the employee's particular work tasks. Also, because these various panels are modular, the various work areas can be disassembled and reassembled in various configurations as needed to ensure that working areas remain efficient as the company's work needs change.

In most if not all of these modular work areas, there will be a variety of types of office equipment, including computers and communication equipment such as telephones and facsimile machines. Since most of the work areas are clustered into groups (typically of two to twelve work spaces), it is most efficient if the communications cables serving the various work stations are led in centrally through the work station panels.

In the past, there have been numerous designs of modular panels which have included paths or raceways for electrical power lines and electronic communication cables. Virtually every manufacturer of modular office structures offers panels incorporating such features; typical systems are described in U.S. Pat. Nos. 4,203,639; 4,841,699; and Re. 31,733. In such panels, the cables are led through narrow raceways and exit at various outlet boxes formed into or attached to the panels, so that the various pieces of office equipment can be connected to the power and/or communication cables by simply being plugged into the outlets on the face of the panels for each work area.

In recent years, fiber optic communications have largely displaced electrical communication systems in many applications, including but not limited to telephone, facsimile and computer communications. Optical fibers carry communication signals much more efficiently than electrical cables, particularly in multiplexing systems, since a much higher number of light signals can be carried separately and distinctly by optical fibers than the number of electrical signals which can be carried by conventional electrical wires. In addition, since there is no radiation field surrounding an optical fiber as there is surrounding an electric wire, many optical fibers can be bundled together without interference between their carried signals. Because of this transition to optical fiber communications, there has been a clear need to be able to use optical fibers in modular office panel systems in place of electrical communication systems.

However, several problems exist which prevent customers from simply directly replacing electrical communication wires with optical communication fibers. First, optical fibers have much different physical properties than electric wires, since they are made of light transmitting materials such as glass and acrylic polymers rather than electrical conductive metals. The physical properties of the glass and polymer fibers require much more space in raceways to make the various turns necessary since light cannot be transmitted around sharp bends in a fiber. See Hecht, *Understanding Fiber Optics*, Chapters 2 and 4 (1987). If the bending radius of the optical fiber is too great, a critical parameter called the confinement angle of the light will be exceeded, so that a portion of the light will escape from the fiber in the curve, thus diminishing or distorting the transmitted signal. Also, glass is susceptible to physical damage. Consequently, different accommodations for optical fibers must be made in panels than are required for electrical wires, which can be bent and twisted essentially at any angle.

Further, optical fibers are more efficiently used for communications if the final distribution point of a signal to a target piece of equipment, such as a telephone or computer, is placed as close to that piece of equipment as is physically reasonable. It is much more technically effective and economical to run a multi-fiber trunk cable from a remote location to the modular work area, and then run the various fiber duplex pairs for the shortest practical distance possible.

In addition, a typically configured remote distribution system reduces the overall efficiency of space planning for the work areas and the manager's ability to organize the work for the most efficient work flow. Because of the significant distance between the distribution room and any individual work station, any change in work tasks assigned to that station or in the equipment used at that station requires that entirely new fiber cables be run from the remote distribution room to the work station, clearly a time consuming and expensive project. Also, since the cables have to be run for some distance, including through the ceiling or floor of the work room, it is not uncommon for such changeovers also to seriously disrupt the work of other employees whose work spaces are located near the work space being converted, at least for the period of the changeover.

Finally, optical fibers are useful for communications, but they are not able to transmit power in addition to signals. Consequently, electrical power must still be provided to the various work areas to run office equipment, including that equipment which receives its signal communications through optical fibers. In the past, this has required separate distribution systems and raceways and therefore most modular equipment manufactures and most business and industrial end-users have been reluctant to incorporate optical fiber communication capability into their panels and other modular products, because of the additional cost, complexity of panels and duplicate distribution structures required.

It would therefore be quite advantageous to have an optical fiber communication apparatus which can be directly incorporated into modular panels, and for such panels to be easily and economically structured to accommodate and to provide optimum use of the optical fibers. Such systems would also provide for rapid and simple reconfiguration of work spaces with little or no loss of signal transmission efficiency or disruption of adjacent work areas.

SUMMARY OF THE INVENTION

The present invention involves an optical fiber communication signal distribution system which is uniquely designed to cooperate with or interfit into the interior of a typical modular office panel. The system can be considered to have three key interacting and cooperating elements; a removable channel, a complementary raceway, and optical fiber signal distribution means incorporated into the channel. The system typically provides fiber optic communication signals to a variety of computers and communication devices such as telephones and facsimile machines. Other aspects of the invention include a panel, such as a modular office partition, or a power pole, into which the system fits, or with which it cooperatively operates; and apparatus comprising the combination of the panel and system.

In a broad embodiment, the invention comprises apparatus for dispersive routing of optical fibers of an optical fiber communication signal distribution system through partition members which comprises: a panel having an interior bounded by front and rear surfaces joined by a plurality of edges; an elongated raceway having an interior bounded by axial ends and top and bottom spaced apart substantially parallel structural members, the raceway cooperating with the panel; first opening means in the raceway providing for passage of a plurality of optical fibers from an exterior location into the interior of the raceway; an elongated U-shaped channel having a length not greater than the length of the raceway and a height and depth not greater than the height and depth of the interior of the raceway, such that the channel is adapted to be removably secured within the raceway; fiber coupling means within and attached to an interior surface of the channel, the means comprising a coupling plate having a pair of apertures therethrough and an optical fiber coupler mounted in each aperture of the pair, each coupler having an inlet end and an outlet end; second opening means comprising an aperture in the raceway providing for passage of a plurality of optical fibers between the interior of the raceway and the interior of the panel; third opening means comprising an aperture in at least one of the front and rear surfaces of the panel providing communication between the interior of the panel and the exterior of the front or rear surface; and the second and third opening means cooperating to permit passage of a pair of optical fibers attached to the outlet end of a pair of the couplers from the interior of the raceway through the interior of the panel to the exterior of the panel.

In another broad aspect, the invention comprises a modular panel comprising: an interior bounded by front and rear surfaces joined by a plurality of edges and having incorporated therewith apparatus for dispersive routing of optical fibers of an optical fiber communication signal distribution system through partition members, which apparatus comprises: a panel having an interior bounded by front and rear surfaces joined by a plurality of edges; an elongated raceway having an interior bounded by axial ends and top and bottom spaced apart substantially parallel structural members, the raceway cooperating with the panel; first opening means in the raceway providing for passage of a plurality of optical fibers from an exterior location into the interior of the raceway; an elongated U-shaped channel having a length not greater than the length of the raceway and a height and depth not greater than the height and depth of the interior of the raceway, such that the channel is adapted to be removably secured within the raceway; fiber coupling means within and attached to an interior surface of the channel, the means comprising a coupling plate having a pair of apertures therethrough and an optical fiber coupler mounted in each aperture of the pair, each coupler having an inlet end and an outlet end; second opening means comprising an aperture in the raceway providing for passage of a plurality of optical fibers between the interior of the raceway and the interior of the panel; third opening means comprising an aperture in at least one of the front and rear surfaces of the panel providing communication between the interior of the panel and the exterior of the front or rear surface; and the second and third opening means cooperating to permit passage of a pair of optical fibers attached to the outlet end of a pair of the couplers from the interior of the raceway through the interior of the panel to the exterior of the panel.

In yet another broad aspect, the invention comprises apparatus for dispersive routing of optical fibers of an optical fiber communication signal distribution system from within a raceway which comprises: an elongated U-shaped channel having a length not greater than the length of the raceway and a height and depth not greater than the height and depth of the interior of the raceway, such that the channel is adapted to be removably secured within the raceway; and fiber coupling means within and attached to an interior surface of the channel, the means comprising a coupling plate having a pair of apertures therethrough and an optical fiber coupler mounted in each aperture of the pair, each coupler having an inlet end and an outlet end. This aspect preferably also further comprises the raceway in an elongated form having an interior bounded by axial ends and top and bottom structural members substantially aligned in parallel and spaced apart by a predetermined distance and having the channel disposed therewithin, the raceway adapted to cooperate with a panel; first opening means in the raceway providing for passage of a plurality of optical fibers from an exterior location into the interior of the raceway; and second opening means comprising an aperture in the raceway providing for passage of a plurality of optical fibers between the interior of the raceway to the exterior of the raceway.

In various preferred embodiments, the channel has a height and depth substantially equal to the height and depth of the interior of the raceway, such that the channel is adapted to be interfitted into and releaseably secured within the raceway by contact with opposed sides of the structural members. In other preferred embodiments, the channel is secured within the raceway by fastening means such as bolts, screws, releasable adhesives and the like.

In other various preferred embodiments, the raceway containing the channel may be disposed in a structure abutting the panel and attached to at least one of the panel's top, bottom or side, or the structure containing said raceway may be an extension member ("power pole") attached to the panel.

The system is flexible and can be used to serve any number of work stations within a modular cluster. It also provides for routing and passage of electrical power lines as well as the optical communications fibers.

DETAILED DESCRIPTION AND PREFERRED EMBODIMENTS

Figure 1:
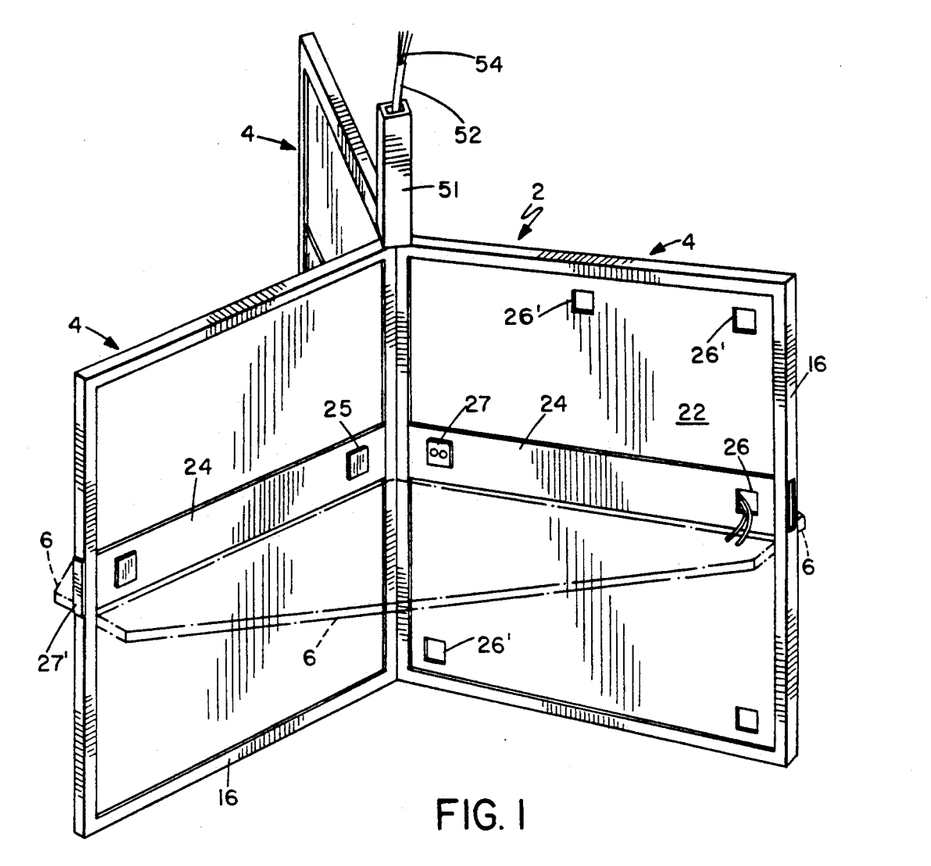
FIG. 1 is a perspective view, partially in phantom, of a typical work area cluster in which the optical fiber system of the present invention is incorporated.

The system of the present invention will be best understood by reference to the drawings. FIG. 1 shows a typical cluster 2 of work stations (in this case three work stations) which are formed by modular panels 4. Each work station itself is represented by desk surfaces 6 shown in phantom. It will be understood, of course, that while these particular panels 4 and desk surfaces 6 are shown as identical, there are many interchangeable commercial panels, counters, desk tops, storage cabinets and the like which are used to form the clusters 2, and the particular configuration or number of modules is not critical to this invention. The system of the present invention is useful with all such configurations, and is not to be construed as being limited solely with any single type of panel or work station configuration. Thus the cluster 2 shown in FIG. 1 should be considered to be merely an example and not limiting for the present invention.

Figure 2:
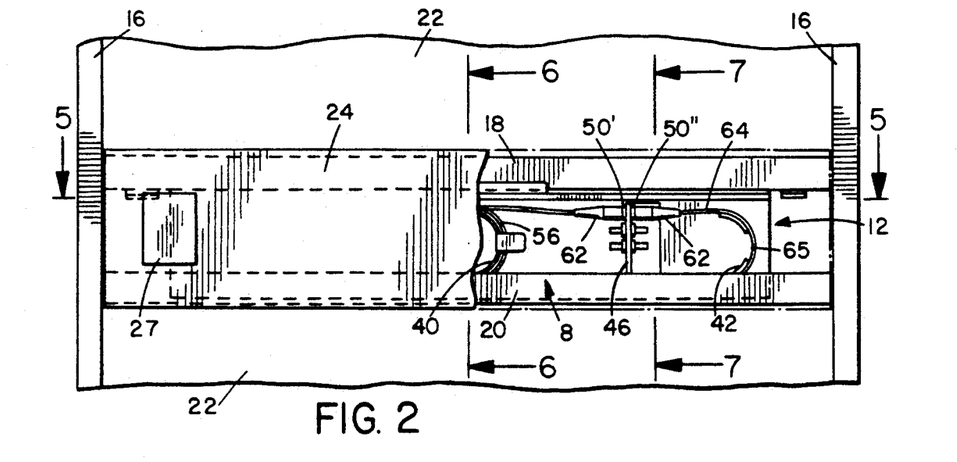
FIG. 2 is a side elevation view, partially cut away, of a portion of one of the panels of FIG. 1 showing the fiber optic communication system of the present invention mounted therein.

One embodiment of the raceway/distribution panel system 8 of the present invention is illustrated in FIGURE 2, which shows a preferred location within a structure such as a panel 4. The system 8 is basically a combination of three interacting and cooperating elements; the removable channel 12, the complementary raceway 10, and the optical fiber signal distribution means 14 incorporated into the channel 12. Each of these will be further described below.

The structure of raceway 10 will be dependent upon whether the raceway is to be located within the panel 4 or is to be disposed in a cooperative position abutting or adjacent to the panel 4 (as at the bottom, top or side or the panel 4, or in an attached "power pole" leading to the panel 4). The structure in which the raceway is within the panel 4 will be considered first. The typical panel structure 4 is normally made of a metal frame 16 with a number of internal horizontal and/or vertical reinforcing members such as cross member 18 and 20. In panels adapted to accommodate the system of the present invention, cross members 18 and 20 will be horizontal and parallel, spaced apart by the height of the channel 12.

Normally the panels 4 will be covered by a decorative facing 22. The system 8 of the present invention normally will be concealed behind another decorative panel 24, with panel 24 being readily removable to allow access to the system 8. In FIG. 1, the panel 24 is shown in one preferred position immediately above the level of the desk top 6. It will be evident that the exact location of the system 8 and panel 24 can be anywhere along the height of the panel 4; for instance, it may be desired to have it near the bottom of the panel.

Also shown in FIG. 1 in association with decorative panels 22 and 24 are various closeable openings 26 in panel 24 and 26' in panels 22. These closeable openings 26 and 26' are to provide for access from the cable distribution means 14 within the channel 12 to the specific pieces of equipment, either directly or through an interface coupling plate 27. One or more openings 26 in the decorative panel 24 comprise the preferred embodiment, although in many cases it will also be desirable to have any one or more of the various openings 26' either instead of or in combination with any of the openings 26. Also, it will be evident that the specific location shown in FIG. 1 are simply representative and that the actual locations of the openings 26 and 26' may be at any desired locations across the surfaces of the panels 22 or 24. Typically when an opening 26 or 26' is not required to be open for cable passage, it is closed by conventional cover plate 25, which can have a surface appearances either to contrast with the panels 22 and 24 or blend with them. Similarly, panels 22 and 24 can have the same or contrasting appearances depending on the visual effect desired by the user.

The raceway 10 will normally extend through entire length of the panel 4 and be aligned with end openings 28 in each panel. The end openings 28 at each end of the panel 4 provide for access of the fiber optic cable to the signal source or to adjacent panels, as will be discussed below. Where the openings 28 are at the outer edge of a panel, as shown in FIG. 1, they can be left open but preferably will be covered with a decorative plate 27' which usually will match the appearance of the metal frame 16. This provides not only a pleasing visual appearance and gives a finished look to the panel 4, but also protects the optical fibers inside from dirt and damage.

Figure 8:
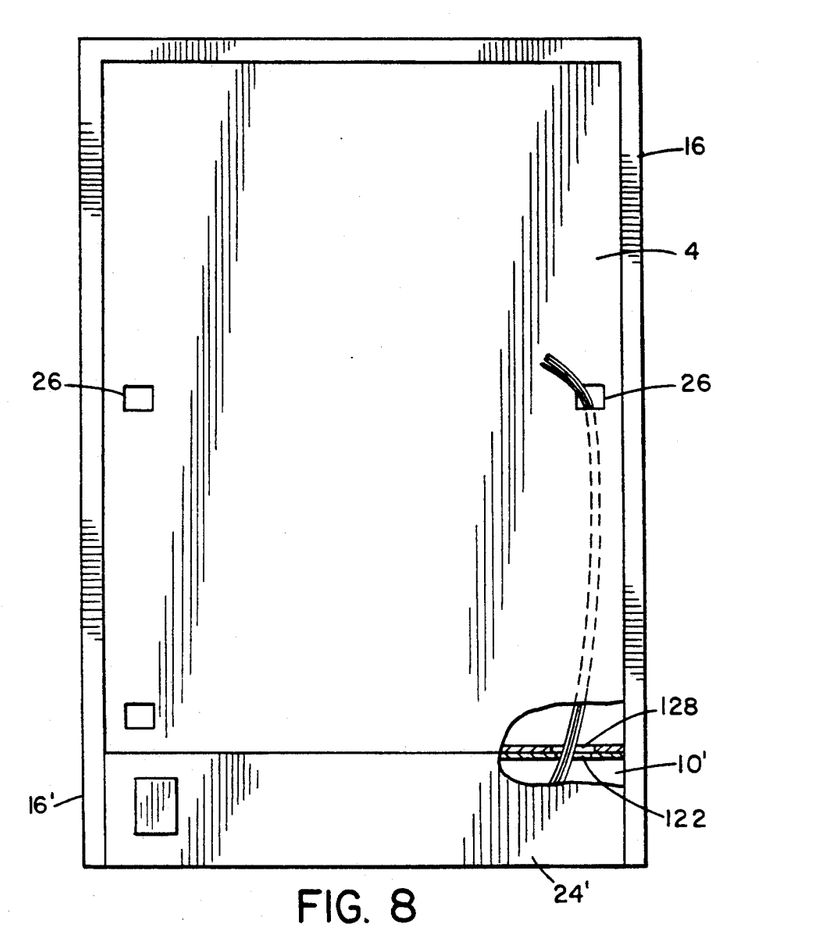
FIG. 8 is front view (with a portion cut away) illustrating another embodiment of the panel mounted in a raceway at the other than fully within (here shown as the bottom) a panel.

There are numerous alternative locations for the raceway 10 with respect to the panel 4. For instance, raceways can be attached to or located within the bottom, top or a side of a panel. An attached structure leading to the panel, such as an extension or "power pole" 51, could be provided with the raceway placed inside. The location within the panel can be at any level and need not be near the midpoint as illustrated in FIG. 1. Further, the raceway need not be disposed horizontally, but could also be vertical or at an acute angle to one or more edges of the panel as desired or dictated by the panel configuration and/or the modular cluster layout. As an illustration of the alternatives, one alternative location for the raceway (designated as 10') is shown in FIG. 8, where the raceway 10' is located at the base of the panel 4, normally behind an access panel 24'. In this case the output cables will pass upward through apertures such as 122 in the raceway and 128 in the bottom of the panel 4 to provide access to the interior of the panel 4 and routing to the openings 26. The frame 16 of the panel 4 may if desired be extended as at 16' to enclose the raceway 10', or the raceway 10' may have its own end cap (not shown). If the frame 16 is not extended, the raceway 10' may have a depth greater than that of the panel 4, and the panel 4 may in effect rest on the raceway 10'. The two will be abutting and directly connected in either case, so that the bottom of the panel 4 serves as the top of the raceway 10'.

Figures 3, 4:
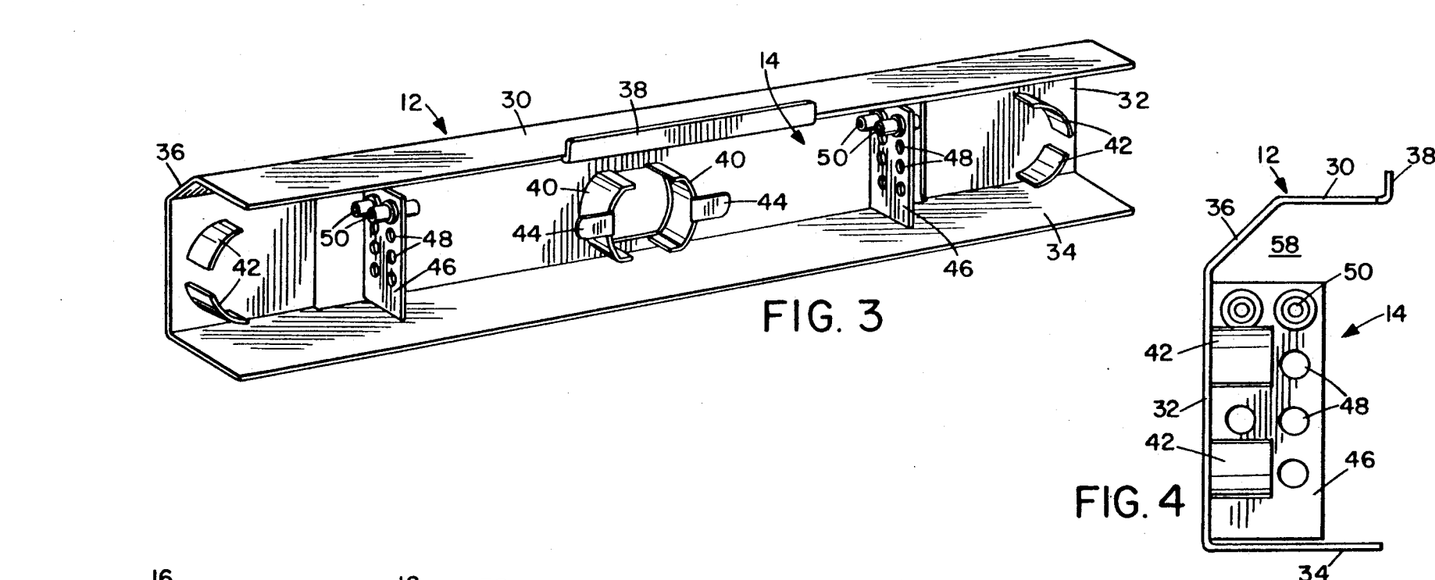
FIG. 3 is an oblique side view of a principal component used in the system of this invention.
FIG. 4 is an end elevation view of the component of FIG. 3.
Figure 6:
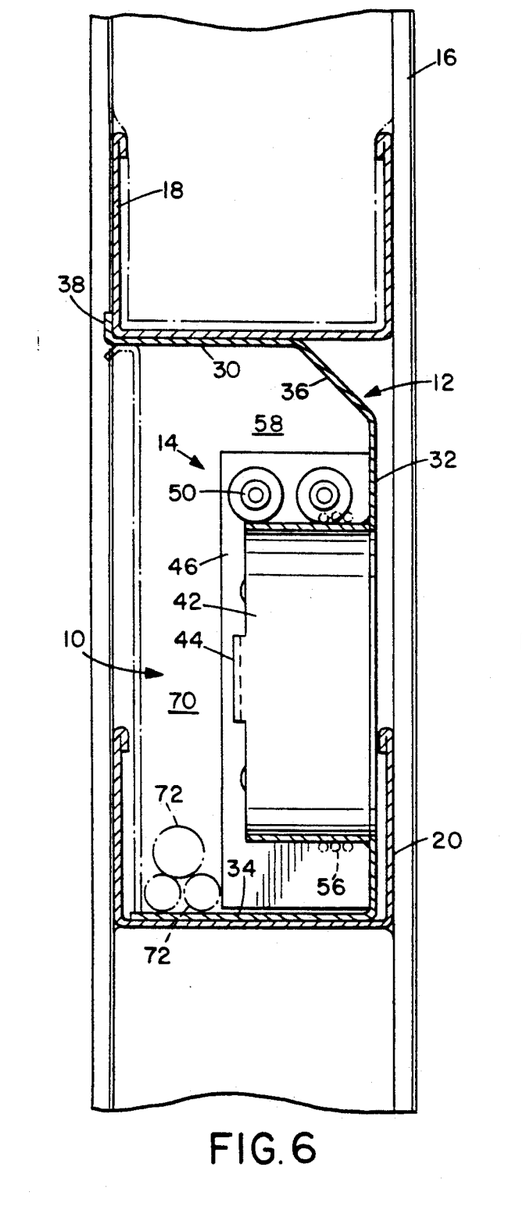
FIG. 6 is an elevation view taken on line 6—6 of FIG. 2.
Figure 7:
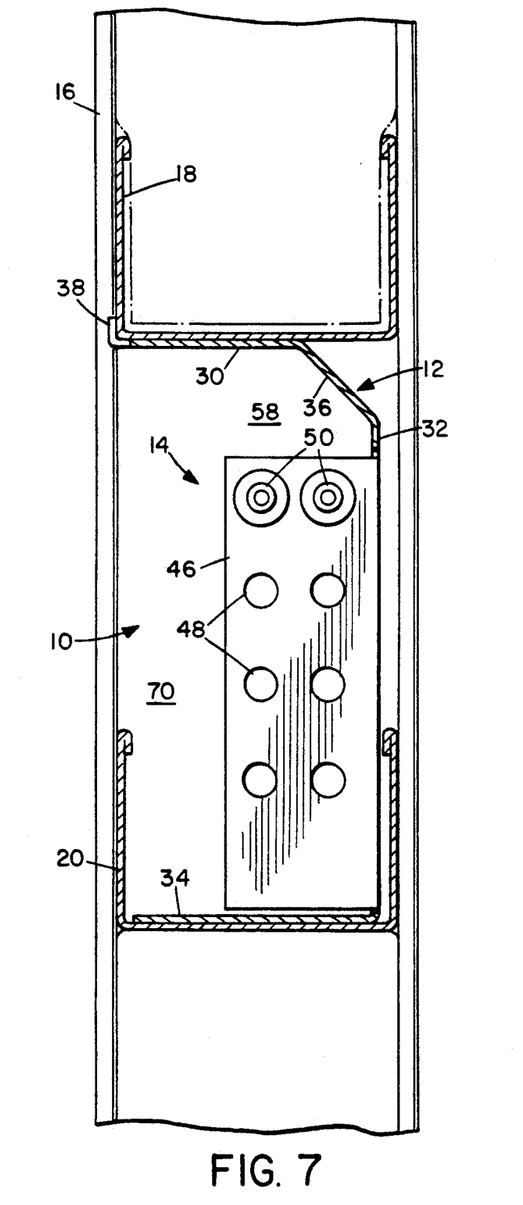
FIG. 7 is an elevation view taken showing an alternative means of securing the structure.

Considering now channel 12, the structure is best illustrated in FIGS. 3 and 4 and the fit of the channel 12 into the raceway 10 is best illustrated in FIGS. 2, 6 and 7. As shown in FIG. 3, the channel 12 is an elongated, generally U-shaped member having a top 30, a back 32 and a base 34. The top 30 is spaced apart from back 32 by an angled side 36, which provides clearance to allow the channel 12 to be inserted into the raceway 10. If desired, there may also be present a lip 38 which as shown in FIG. 6 provides a stop to control the angle and depth of the insertion of the channel 12 into raceway 10.

The preferred fit of the channel 12 into raceway 10 is best seen in FIG. 6. In this embodiment top 30 abuts and is in contact with the bottom of cross member 18 while the base 34 abuts and is in contact with the bottom of cross member 20. The angled portion 36 allows enough flexibility in the channel 12 (which is preferably made of sheet metal but could be made of heavy plastic or a moderately stiff rubber material) to allow the panel to be placed into the raceway by first inserting the bottom 34 and then pushing the rest of the channel 12 into the opening between cross members 18 and 20. The top 30 and edge 36 will flex slightly to enter the raceway 10 space between cross members 18 and 20 and then will resile to the contacting and securing position shown in FIGS. 6 and 7 with lip 38 forming a stop to prevent further insertion. The distance between the contacting surfaces of cross members 18 and 20 will be essentially equal to the distance between the outer surfaces of top 30 and bottom 34 of channel 12, so that the channel 12 will be snugly seated in the raceway 10. The fit should be snug enough that the channel 12 is not easily dislodged and does not move and rattle within the raceway 10, since such motion and noise is both potentially harmful to the optical fibers and distracting and annoying to the people using the work areas. However, the fit should not be so snug that the channel 12 cannot be removed by firm hand pressure when a technician wishes to remove the channel 12 to reconfigure the cables and optical fibers or perform maintenance on the unit. Those skilled in the art will have no difficulty determining the proper amount of resistance to be incorporated into the system by proper selection of the particular metal, plastic or rubber selected, the thickness of the material and its resilience.

An alternative embodiment is shown in FIG. 7. In this embodiment the top of channel 12 does not reach the cross member 18, so that channel 12 is not secured in place by the frictional engagement with cross members 18 and 20. In this embodiment, securement is by means of one or more fasteners 35, such as sheet metal screws or bolts, which attach bottom 34 of channel 12 to cross member 20. Other points of attachment may also be used. For instance, top 30 of channel 12 could be attached by a fastener such as 35 to the cross member 18, so that the channel 12 was suspended from cross member 18 rather than resting on cross member 20 as illustrated.

Yet another option is also indicated in FIG. 7. If desired one or more spacers 37 may be placed between top 30 of channel 12 and the underside of cross member 18, or alternatively between bottom 34 of channel 12 and the top of cross member 20, to obtain frictional engagement either alone or in combination with an elongated fastener 37'.

The third component is the means 14 for securing and distributing the optical fibers. The integration of this distribution means within the raceway 10 itself as mounted on channel 12 is a critical element of the present invention and overcomes many of the problems of the prior art. This allows the main optical fiber cable or bundle 52 to be continued directly to the interior of the panel 4 so that the actual distribution fibers can be of minimal length, thus increasing flexibility, cost effectiveness and maintainability of the system.

The distribution structure 14 is comprised of two portions, the fiber guide portion and the individual fiber coupler portion. The fiber guide portion is made up of central curved brackets 40 and end curved brackets 42. Either or both may have outwardly extending tabs 44 to retain the fibers in position, and it is preferred that tabs 44 be present on the central brackets 40. The fiber coupler portion comprises perforated plates 46, each of which has paired holes 48 through each plate and in which holes are mounted one or more pairs of fiber optic couplers 50. ("Couplers" 50 may be conventional couplers or may be attentuators, splices, high density clips or any other similar device for functionally attaching the ends of the optical fibers. Specific examples will be identified below. For the purposes of this invention, therefore, the term "couplers" will be understood to include all functionally equivalent devices.)

Typically the number of paired holes 48 in each plate 46 will be equal to one half the total number of fiber optic pairs which are expected to be used in the distribution system. This allows for maximum flexibility and minimum height of the unit 12. It is however possible to have the number of holes 48 in each plate 46 equal the total number of fiber optic pairs or have the total number of pairs of holes 48 be unevenly distributed between the two plates 46. Also, it is not necessary to have all pairs of couplers 50 installed initially. Rather one can initially install only the number of pairs of couplers 50 which will initially be needed, leaving the remaining holes 48 vacant for future expansion of the system, with the additional pairs of couplers 50 being added as needed.

Figure 5:
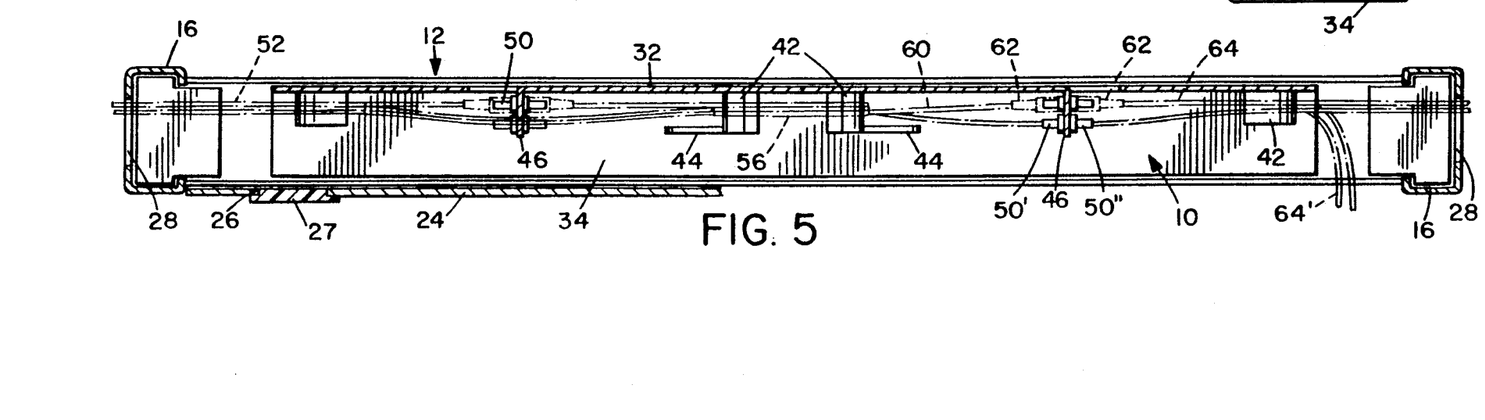
FIG. 5 is a plan view taken on line 5—5 of FIG. 2.

As best seen in FIGS. 1, 2 and 5, the main fiber optic cable 52 containing the optical fibers 54 (usually in pairs) is passed into a central joint portion of the cluster 2 formed by the interconnection of panels 4 and then passed between the panels 4 and through one of the openings 28 into the interior of the raceway 10 and channel 12. It is most expedient to have the cable 52 initially contain the maximum number of fiber optic pairs 54 that the cluster 2 is expected to need in the foreseeable future. This greatly simplifies use of the system, because the master cable 52 is then fully installed and the individual fiber optic pairs to different communications devices can be readily installed when needed simply by patching to the couplers 50, as will be described below. It will be recognized, however, that as unexpected needs occur or the cluster 2 grows beyond the original design capacity, the original cable 52 can be replaced or be supplemented by installation of additional cables to additional channels 12 in other panels 4 of the enlarged cluster 2. It is one of the advantages of this system that such expansion is readily accommodated with little or nor disruption of employees' work patterns beyond that normally incurred in the physical enlargement of the modular complex 2.

When the main cable 52 is brought into the interior of the channel 12 it is first routed over the top of the closest plate 46 through the open space 58 under top 30 and angled side 36, usually secured onto side 36 by some convenient means such as tie-wraps, and then looped around brackets 40 behind tabs 44 as shown in FIG. 5 to terminate within the channel 12. Preferably the main cable 52 will terminate just short of the brackets 40 and the individual fiber duplex pairs 60 themselves will be looped around the brackets 40. Regardless of whether it is the main cable 52 or the individual pairs 60 which are looped, the looping turn pattern 56 maintains the proper curvature and avoids kinking and bending of optical fibers, as is known from the prior art; see for instance U.S. Pat. Nos. 4,976,510; 5,013,112; and 5,109,467. It is unique to the present invention, however, that the termination of the main cable 52 occurs not in a remote distribution room or junction box but rather in the raceway 10 and panels 4 at the cluster site.

After the main cable 52 has been laid in one or more turns 56 around the central bracket 40, the individual fiber pairs 60 are separated and routed with each fiber 54 directed to its respective inlet half 50' of a coupler pair 50. Normally each optical fiber 54 is terminated by a plug 62 which mates with the respective inlet portion 50' of the coupler 50. On the opposite or outlet side 50" of the coupler 50, the outlet cable pair 64 passes to the individual communication device through an opening 26 either directly or through an interface coupler plate 27. Alternatively, as shown at 64', the outlet fiber pair may pass on through an end opening 28 of the panel 4 into an adjacent panel for attachment to a communication device located at another part of the work station or at a neighboring work station. The outlet fiber will also be capped at its end by appropriate plug 62. In the normal configuration, each coupler 50 is made up of two female ends 50' and 50" while the plugs 62 are male units. This minimizes the risk of damage to the couplers 50 when they are not in use. It will be of course evident that the male:female relationship of the plugs and couplers can be reversed if desired.

The unused portions of the incoming fiber pairs can be coupled to the inlet part 50' of couplers 50 which fill all of the pairs holes 48, which is preferred, so that subsequent connections of any external device can be made by a simple attachment of the external device's own cable to the outlet side 50" of a coupler 50. It is possible, however, to have only the number of couplers 50 in place that are actually to be used at any given time. In this case, the end portions of the unused cable pairs 60 will be further looped around the brackets 40 to be held conveniently available for use when needed.

When in the preferred embodiment in which the two plates 46 each contains one-half of the total number of holes 48 needed for all the fiber optic pairs 60, it will often be found that the various communication devices are not equally divided in terms of their location with respect to the system 8 and that therefore certain of the outlet fiber leads 64 must be turned 180° from the outlet side of the plate 46 to which they are attached so that they can be led out through the channel 12 in the opposite direction. In order to avoid kinking of such cables during the turn, they are looped around the end brackets 42 as shown at 65 in FIG. 2 and then threaded back to the other end of channel 12, usually through the space 70, to exit through an opening 26 or 28 as appropriate.

Figure 9:
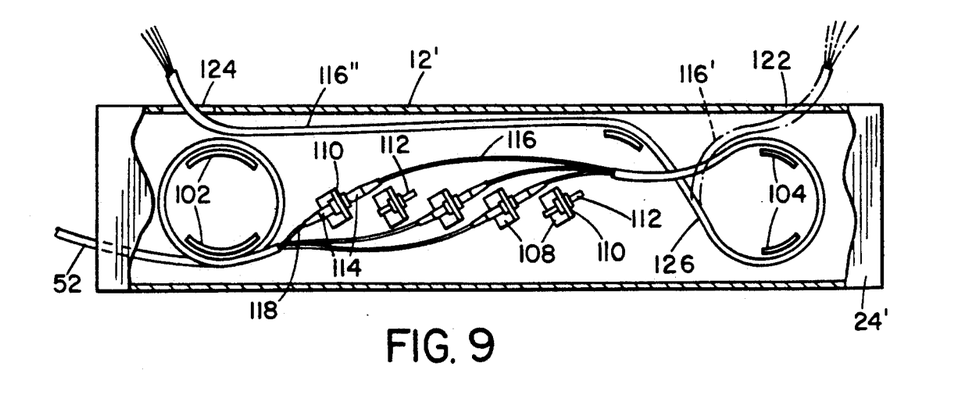
FIG. 9 is an enlarged front view similar to that of FIG. 3 showing a different embodiment of the component.

Another embodiment of the channel (designated 12') is shown in FIG. 9. In this embodiment there are brackets 102 and 104 located toward the ends of the channel 12'. An array 106 of small plates 108 are arranged centrally of the channel 12'. Each plate 108 is perforated with an opening 110 into which is mounted a pair of fiber optic couplers 112 (only one of each pair is visible in FIG. 9 since they are shown as disposed perpendicular to the back of the channel 12'). Each of these couplers 112 can accommodate the mating ends 114 of fiber optic cable pairs 116 and 118. The particular arrangement of the plates 108 is not critical, although they will be disposed such that the fiber optic pairs 116 and 118 attached to the various plates 108 do not interfere with each other. It is convenient to have all plates aligned generally parallel to each other and angled at approximately 20°–45° to the longitudinal axis of the channel 12'. If the angle is significantly smaller, the optical fibers may interfere with each other, and if it is significantly greater, they may be forced into unduly sharp bends, which could damage or rupture the fibers.

In operation, the trunk cable 52 enters through an appropriate aperture, usually an open end 120 of the channel 12' and then is coiled around bracket 102. The individual optical fiber pairs 118 are separated and each fiber of a pair is led to an individual plate 108 and attached to the input side of a coupler 112, in the same manner described above with reference to FIGS. 2 and 5. Each pair of couplers 112 can also receive one end of an output cable pair 116, which pair 116 leads to an individual piece of equipment, also as described above. In FIG. 9 cables 116 are shown as being led around bracket 104 before being routed out of the channel 12' through apertures such as 122 and 124. In practice, one can in some cases dispense with leading output cable 116' around the bracket 104 since it can exit through aperture 122 without undue bending. It will normally be necessary to lead output cable 116" around the bracket 104, however, since it must make essentially a complete reversal in direction to exit through aperture 124.

The output cables 116, 116' and 116" are shown in FIG. 9 as optionally being sheathed by sheath 126 over a portion of their length and then separated into individual pairs after exit through the apertures 122 and 124. This may be of advantage where several optical output cables are being directed as a group to a specific equipment area.

As mentioned before, it is also necessary that the panels 4 be provided with conventional electrical power lines to operate the various communication devices as well as other electrical office equipment such as calculators, photocopiers or the like. Therefore it will be seen from the drawings, particularly FIGS. 6 and 7, that the plates 46 and brackets 40 and 42 do not extend to the complete width and depth of the channel 12, but rather leave a space 70 between the open side (front) of the channel 12 and the brackets and plates. Existence of this space 70 allows for routing of the redirected fiber optic pairs from 65 past the plates and brackets. More importantly, however, it allows space for conventional electrical cables 72 to be laid through the same raceway 10 as houses the channel 12. The optical fibers and the communication signals are not effected in any way by the presence of the electrical cables 72 since the light transmission signals have no electrical field which would be disrupted by the electrical fields of the cables 72. Thus, the overall system within the panels 4 is particularly and desirably compact and provides means for transmission of both electrical power and optical fiber communication signals in a single raceway.

A wide variety of optical fibers, fiber couplers, mechanical splices, fiber cables and plugs may be used in the present invention. The fiber optic main trunk cable 52 is commonly a 12- or 24-fiber cable, FDDI-rated, tight-buffered distribution style, plenum rated. Typical examples are cables available from Siecor Optical Cable Corporation under part nos. 12K82-31141-04 or 24K82-31141-04, from AT&T under part nos. LGBC-012A-LPX and LGBC-024A-LPX, and from Cooper Industries/Belden Division under part no. 550266. The fiber duplex jumper cables (pairs) are commonly two-fiber FDDI-rated, tight- buffered, breakout style; typical examples are those available from AT&T under part no. 1861A and from Cooper Industries/Belden Division under part no. 225182. Fiber optic connectors (plugs) will usually be ST-compatible connectors; a typical preferred example will be the 3M "Push-Pull" connector, available from the 3M Company under part no. 6102-H. Other commercially available connector types which are useful include SC, FC/PC, D4, and so forth. Fiber optic couplers are ST-compatible (when using ST plugs) couplers (female: female); a typical example is that available from AT&T under part no. C2000A-2. For applications where it is preferred to utilize duplex connectors, the 3M "Push-Pull" connectors may be connected together with a duplex clip available from 3M Company under part no. 6199-DC. In this duplex configuration, a locking clip (available from 3M Company under part no. 6199-LC) may be utilized to lock the connectors in a mated position with couplers. ST-compatible duplex couplers with individual metals plates are available from 3M Company under part no. 2155-CKMM. In addition, as noted fiber optic mechanical splices may be utilized in place of fiber optic connectors and couplers. A typical example are the splices commercially available from the 3M Company under the trade name "3M Fibrlok" as parts nos. 2525, 2590 and 2599.

It is therefore not intended that the present invention be limited by the particular type of optical fiber, coupler, splice or other component which is selected. Rather those skilled in the art will understand and recognize that there are a wide variety of different combinations of couplers, cables and other components which can be used with the present system. It will be further recognized that any reasonable number of fiber pairs can be used with a system of this invention, limited only to the number of plates 46 or 108 and fiber pairs 54 or 116 which can be fitted into the available space. For instance, in one embodiment there may be two or more plates 46 on either side of the center bracket 40 in a channel 12, spaced far enough apart so that the couplers and attached optical fibers 60 and 64 do not interfere with each other. In this case, the fiber pairs 60 and 64 directed to or away from a particular panel 46 would pass through space 70 when passing other panels 46 so that they could be routed as desired. It will also be recognized that if there is more than one incoming cable 52, the extra cable or cables can pass directly through space 70 or a given raceway 10 and not interfere with a particular distribution system 14 and on through paired openings 28 into other panels in the cluster and be terminated in a different system 8 mounted elsewhere in the clustered panels 4.

It will be evident from the above that there are numerous embodiments of this invention which, while not expressly set forth above, are clearly within the scope and spirit of the invention. The above description is therefore intended to be exemplary only, and the scope of the invention is to be limited solely by the appended claims.

I claim:

1. Apparatus for dispersive routing of optical fibers of an optical fiber communication signal distribution system through partition members which comprises:
   a panel having an interior bounded by front and rear surfaces joined by a plurality of edges;
   an elongated raceway having an interior bounded by axial ends and top and bottom spaced apart substantially parallel structural members, said raceway cooperating with said panel;
   first opening means in said raceway providing for passage of a plurality of optical fibers from an exterior location into said interior of said raceway;
   an elongated U-shaped channel having a length not greater than the length of said raceway and a height and depth not greater than the height and depth of said interior of said raceway, such that said channel is adapted to be removably secured within said raceway;
   fiber coupling means within and attached to an interior surface of said channel, said means comprising a coupling plate having a pair of apertures therethrough and an optical fiber coupler mounted in each aperture of said pair, each said coupler having an inlet end and an outlet end;
   second opening means comprising an aperture in said raceway providing for passage of a plurality of optical fibers between said interior of said raceway and said interior of said panel;
   third opening means comprising an aperture in at least one of said front and rear surfaces of said panel providing communication between said interior of said panel and the exterior of said front or rear surface; and
   said second and third opening means cooperating to permit passage of a pair of optical fibers attached to said outlet end of a pair of said couplers from the interior of said raceway through said interior of said panel to the exterior of said panel.

2. Apparatus as in claim 1 further comprising fiber support means within and attached to an interior surface of said channel, said support means comprising a bracket having a curvature compatible with the light confinement angle of optical fibers to be supported by said bracket.

3. Apparatus as in claim 2 wherein there are a plurality of said brackets.

4. Apparatus as in claim 1 wherein said raceway is disposed within said panel, said raceway having a depth not greater than the depth of said panel and being disposed between said front and rear surfaces of said panel.

5. Apparatus as in claim 4 wherein said raceway extends across one major dimension of said panel.

6. Apparatus as in claim 4 wherein said raceway is incorporated into said panel with both of said top and bottom structural members of said raceway extending between two oppositely disposed edges.

7. Apparatus as in claim 4 wherein said raceway is disposed vertically within said panel.

8. Apparatus as in claim 4 wherein said raceway is disposed horizontally within said panel.

9. Apparatus as in claim 1 wherein said raceway is disposed in a structure abutting said panel.

10. Apparatus as in claim 9 wherein said structure containing said raceway is attached to at least one of a top, bottom or side of said panel.

11. Apparatus as in claim 9 wherein structure containing said raceway comprises an extension member attached to said panel.

12. Apparatus as in claim 1 wherein said channel has a height and depth substantially equal to the height and depth of said interior of said raceway, such that said channel is adapted to be interfitted into and releaseably secured within said raceway by contact with opposed sides of said structural members.

13. Apparatus as in claim 12 wherein a side of said channel is angled to facilitate said interfitting into said raceway.

14. Apparatus as in claim 12 wherein said channel can be released from its securement within said raceway by a firm hand pull.

15. Apparatus as in claim 1 wherein said channel is secured within said raceway by fastening means.

16. Apparatus as in claim 4 further comprising an access aperture in at least one of said surfaces of said panel and providing direct access from said exterior of said panel into said interior of said raceway, said access aperture being of a size sufficient to enable said channel to interfitted into and secured within said raceway from said exterior of said panel.

17. Apparatus as in claim 16 wherein said access aperture is closable.

18. Apparatus as in claim 4 wherein said first opening means comprises an aperture in one of said edges, said aperture being aligned with one of said ends of said raceway.

19. Apparatus as in claim 18 wherein there are a plurality of said apertures, with at least one said aperture aligned with each end of said raceway.

20. Apparatus as in claim 1 wherein said first opening means comprises an aperture in one of said ends of said raceway.

21. Apparatus as in claim 20 wherein there are a plurality of said apertures, with at least one said aperture disposed in each end of said raceway.

22. Apparatus as in claim 1 wherein there are a plurality of said second opening means in said front and rear surfaces.

23. Apparatus as in claim 1 wherein said coupling plate contains a plurality of said pairs of apertures.

24. Apparatus as in claim 23 further comprising a plurality of said plates, each with a plurality of said apertures.

25. Apparatus as in claim 24 wherein each of said plates contains an equal number of said apertures.

26. Apparatus as in claim 1 further comprising a plurality of coupling plates.

27. Apparatus as in claim 26 wherein said plurality of coupling plates are aligned across said surface of said channel at an angle such that said couplers are substantially parallel to each other.

28. Apparatus as in claim 27 wherein said angle is between about 20°–45° to a longitudinal axis of said channel.

29. Apparatus as in claim 1 wherein said plate projects outwardly into the interior of said channel by a dimension less than the depth of said channel, with an open passage formed thereby between said plate and an open side of said channel.

30. A modular panel comprising:
an interior bounded by front and rear surfaces joined by a plurality of edges and having incorporated therewith apparatus for dispersive routing of optical fibers of an optical fiber communication signal distribution system through partition members, which apparatus comprises:
a panel having an interior bounded by front and rear surfaces joined by a plurality of edges;
an elongated raceway having an interior bounded by axial ends and top and bottom spaced apart substantially parallel structural members, said raceway cooperating with said panel;
first opening means in said raceway providing for passage of a plurality of optical fibers from an exterior location into said interior of said raceway; an elongated U-shaped channel having a length not greater than the length of said raceway and a height and depth not greater than the height and depth of said interior of said raceway, such that said channel is adapted to be removably secured within said raceway;
fiber coupling means within and attached to an interior surface of said channel, said means comprising a coupling plate having a pair of apertures therethrough and an optical fiber coupler mounted in each aperture of said pair, each said coupler having an inlet end and an outlet end;
second opening means comprising an aperture in said raceway providing for passage of a plurality of optical fibers between said interior of said raceway and said interior of said panel;
third opening means comprising an aperture in at least one of said front and rear surfaces of said panel providing communication between said interior of said panel and the exterior of said front or rear surface; and
said second and third opening means cooperating to permit passage of a pair of optical fibers attached to said outlet end of a pair of said couplers from the interior of said raceway through said interior of said panel to the exterior of said panel.

31. A panel as in claim 30 wherein said raceway is disposed within said panel, said raceway having a depth not greater than the depth of said panel and being disposed between said front and rear surfaces of said panel.

32. A panel as in claim 31 wherein said raceway extends across one major dimension of said panel.

33. A panel as in claim 30 wherein said channel has a height and depth substantially equal to the height and depth of said interior of said raceway, such that said channel is adapted to be interfitted into and releaseably secured within said raceway by contact with opposed sides of said structural members.

34. A panel as in claim 33 wherein a side of said channel is angled to facilitate said interfitting into said raceway.

35. A panel as in claim 33 wherein said channel can be released from its securement within said raceway by a firm hand pull.

36. A panel as in claim 30 wherein said channel is secured within said raceway by fastening means.

37. A panel as in claim 30 further comprising an access aperture in at least one of said surfaces of said panel and providing direct access from said exterior of said panel into said interior of said raceway, said access aperture being of a size sufficient to enable said channel to interfitted into and secured within said raceway from said exterior of said panel.

38. A panel as in claim 37 wherein said access aperture is closable.

39. A panel as in claim 30 wherein there are a plurality of said second opening means in said front and rear surfaces.

40. A panel as in claim 30 having attached thereto a structure within which said raceway is disposed.

41. A panel as in claim 40 wherein said structure containing said raceway is attached to at least one of a top, bottom or side of said panel.

42. A panel as in claim 40 wherein structure containing said raceway comprises an extension member attached to said panel.

43. Apparatus for dispersive routing of optical fibers of an optical fiber communication signal distribution system from within a raceway which comprises:
an elongated U-shaped channel having a length not greater than the length of said raceway and a height and depth not greater than the height and depth of said interior of said raceway, such that said channel is adapted to be removably secured within said raceway; and
fiber coupling means within and attached to an interior surface of said channel, said means comprising a coupling plate having a pair of apertures therethrough and an optical fiber coupler mounted in each aperture of said pair, each said coupler having an inlet end and an outlet end.

44. Apparatus as in claim 43 further comprising
said raceway being in an elongated form having an interior bounded by axial ends and top and bottom structural members substantially aligned in parallel and spaced apart by a predetermined distance and having said channel disposed therewithin, said raceway adapted to cooperate with a panel;
first opening means in said raceway providing for passage of a plurality of optical fibers from an exterior location into said interior of said raceway; and
second opening means comprising an aperture in said raceway providing for passage of a plurality of optical fibers between said interior of said raceway to the exterior of said raceway.

45. A panel as in claim 44 wherein said channel has a height and depth substantially equal to the height and depth of said interior of said raceway, such that said channel is adapted to be interfitted into and releaseably secured within said raceway by contact with opposed sides of said structural members.

46. A panel as in claim 45 wherein a side of said channel is angled to facilitate said interfitting into said raceway.

47. A panel as in claim 45 wherein said channel can be released from its securement within said raceway by a firm hand pull.

48. A panel as in claim 44 wherein said channel is secured within said raceway by fastening means.

49. Apparatus as in claim 43 further comprising fiber support means within and attached to an interior surface of said channel, said support means comprising a bracket having a curvature compatible with the light confinement angle of optical fibers to be supported by said bracket.

50. Apparatus as in claim 47 wherein there are a plurality of said brackets.

51. Apparatus as in claim 43 wherein said coupling plate contains a plurality of said pairs of apertures.

52. Apparatus as in claim 49 further comprising a plurality of said plates, each with a plurality of said apertures.

53. Apparatus as in claim 43 further comprising a plurality of said coupling plates.

54. Apparatus as in claim 51 wherein said plurality of coupling plates are aligned across said surface of said channel at an angle such that said couplers are substantially parallel to each other.

55. Apparatus as in claim 52 wherein said angle is between about 20°–45° to a longitudinal axis of said channel.

* * * * *